(12) United States Patent
Lew et al.

(10) Patent No.: US 9,611,365 B2
(45) Date of Patent: Apr. 4, 2017

(54) METHOD OF INTRODUCING AN ADDITIVE INTO A POLYMERIC MATERIALS

(71) Applicant: COLORMATRIX HOLDINGS, INC., Wilmington, DE (US)

(72) Inventors: Chun Lew, Knowsley (GB); Phillip Winrow, West Lancashire (GB); Andrew Overend, Bolton (GB); John Goulbourn, Liverpool (GB)

(73) Assignee: COLORMATRIX HOLDINGS, INC., Wilmington, DE (US)

( * ) Notice: Subject to any disclaimer, the term of this patent is extended or adjusted under 35 U.S.C. 154(b) by 153 days.

(21) Appl. No.: 14/411,719

(22) PCT Filed: Jun. 24, 2013

(86) PCT No.: PCT/IB2013/055178
§ 371 (c)(1),
(2) Date: Dec. 29, 2014

(87) PCT Pub. No.: WO2014/001996
PCT Pub. Date: Jan. 3, 2014

(65) Prior Publication Data
US 2015/0166740 A1    Jun. 18, 2015

Related U.S. Application Data

(60) Provisional application No. 61/665,537, filed on Jun. 28, 2012.

(51) Int. Cl.
| | | |
|---|---|---|
| B29B 7/94 | (2006.01) |
| C08J 3/20 | (2006.01) |
| D01F 1/02 | (2006.01) |
| D01F 1/04 | (2006.01) |
| D01F 1/06 | (2006.01) |
| D01F 1/07 | (2006.01) |
| D01F 1/09 | (2006.01) |
| D01F 1/10 | (2006.01) |
| C08J 3/205 | (2006.01) |
| B29B 7/00 | (2006.01) |
| D01D 5/08 | (2006.01) |
| D01F 6/62 | (2006.01) |

(52) U.S. Cl.
CPC ............. *C08J 3/2053* (2013.01); *B29B 7/002* (2013.01); *C08J 3/201* (2013.01); *C08J 3/205* (2013.01); *C08J 3/2056* (2013.01); *D01D 5/08* (2013.01); *D01F 1/103* (2013.01); *D01F 1/106* (2013.01); *D01F 6/62* (2013.01); *C08J 2367/02* (2013.01); *D10B 2331/04* (2013.01)

(58) Field of Classification Search
CPC .... B29B 7/002; B29B 7/94; C08J 3/20; C08J 3/201; C08J 3/205; C08J 3/2053; C08J 3/2056; D01D 5/08; D01F 1/02; D01F 1/04; D01F 1/06; D01F 1/07; D01F 1/09; D01F 1/10; D01F 1/103; D01F 1/106; D01F 6/62
USPC ................. 264/78, 210.6, 211, 349; 524/311
See application file for complete search history.

(56) References Cited

U.S. PATENT DOCUMENTS

| | | |
|---|---|---|
| 4,167,503 A | 9/1979 | Cipriani |
| 5,116,547 A | 5/1992 | Tsukahara et al. |
| 5,236,645 A | 8/1993 | Jones |
| 5,599,529 A | 2/1997 | Cowie |
| 2011/0151737 A1* | 6/2011 | Moore ..................... D01F 1/10 442/334 |

FOREIGN PATENT DOCUMENTS

| | | |
|---|---|---|
| DE | 102004039183 A1 | 3/2006 |
| EP | 0310181 A2 | 5/1989 |
| WO | 2010117268 A1 | 10/2010 |
| WO | 2012085550 A2 | 6/2012 |

OTHER PUBLICATIONS

PCT Pat App No. PCT/IB2013/055178, International Search Report, mailed Nov. 27, 2013, 4 pp.

\* cited by examiner

*Primary Examiner* — Leo B Tentoni
(74) *Attorney, Agent, or Firm* — Fay Sharpe LLP

(57) ABSTRACT

Additives such as colorants may be incorporated into polymeric materials such as polyesters, such as in polyester fiber production, by use of a liquid formulation comprising colorant and a vehicle. The vehicle may comprise a functionalized pentaerythritol, trimethylolpropane or trimellitate. The liquid formulation is suitably contacted with the polymeric material in a melt processing apparatus.

19 Claims, 1 Drawing Sheet

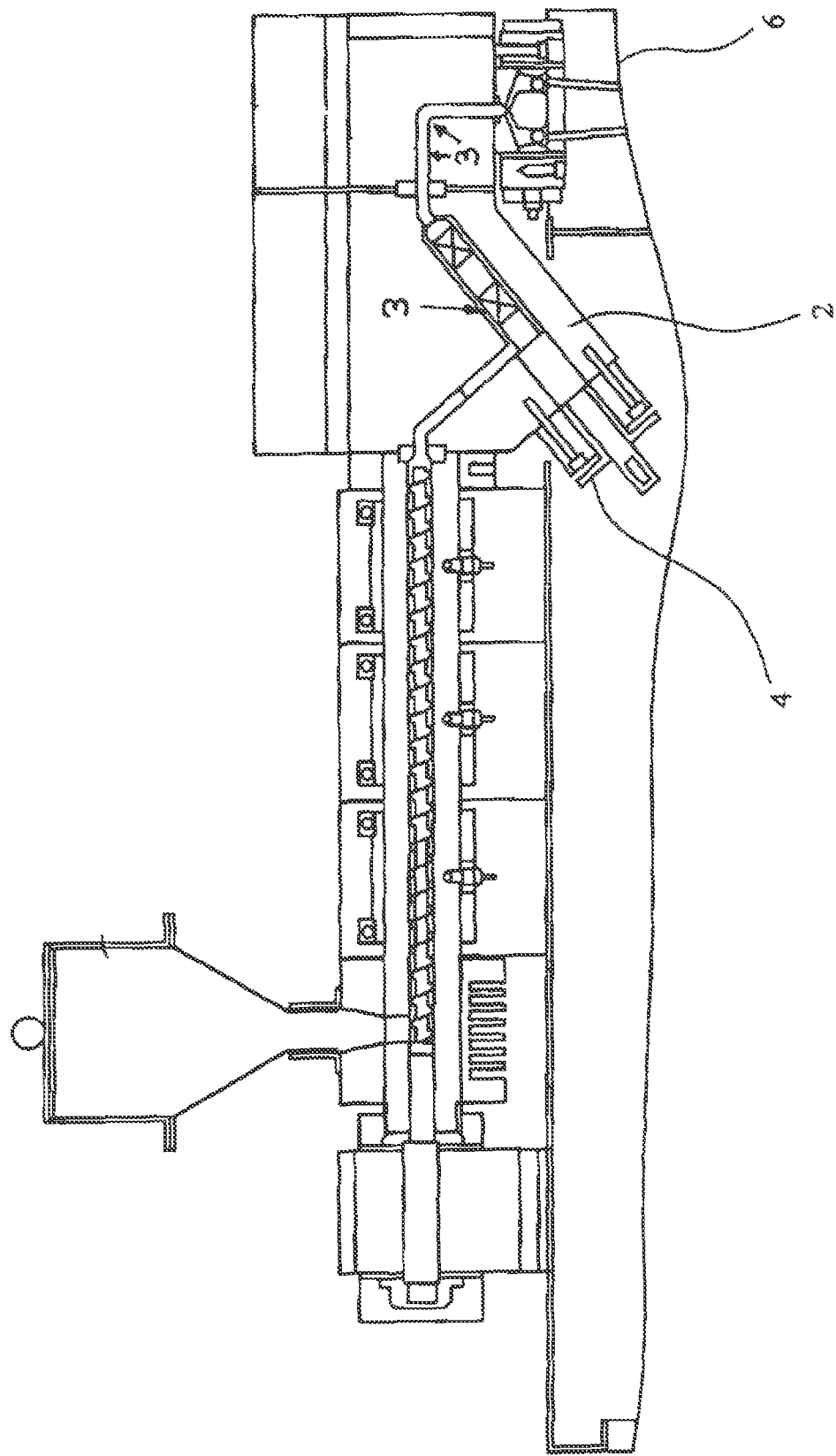

METHOD OF INTRODUCING AN ADDITIVE INTO A POLYMERIC MATERIALS

This invention relates to polymeric materials and particularly, although not exclusively, relates to incorporation of additives such as colourants into polymeric materials, for example polyesters, such as in polyester fibre production.

It is known to incorporate additives, (e.g. colorants, stabilizers, delusterants, anti-static agents, optical brighteners, processing aids etc.) into fibres post-production by bath dyeing or spin dyeing. However disadvantageously, this requires large volumes of liquid additive formulations to enable the additive to permeate into the fibre; the process can be time-consuming; and the fibre must be dried following the permeation process.

It is also known to use a masterbatch containing additives to introduce the additives into a polymer. For example pellets of the masterbatch and pellets of the polymer may be introduced into an extruder via its feedthroat and the two components melt-processed together. Disadvantageously, however, cleaning of the extruder is time-consuming, since the entire length of the extruder needs cleaning between, for example colour changes; and dosing and handleability of solid pelletized masterbatch can be challenging. In addition, some properties of materials, for example spun fibre, made using masterbatches, may be detrimentally affected.

A preferred method of incorporating additives would be incorporation of a liquid into a polymer melt. This may be achieved using a formulation comprising a carrier medium or vehicle in which the additive is dispersed prior to injection into the melt. However, disadvantageously, it is found that use of the formulation may lead to carrier degradation, die head pressure drop, fuming at the die head and/or poor properties of the polymeric material after incorporation of the additive.

It is an object of the present invention to address the aforementioned problems.

According to a first aspect of the invention, there is provided a method of introducing an additive into a polymeric material comprising:

A) selecting a liquid formulation comprising an additive (for example a colourant) and a vehicle;
B) contacting the liquid formulation with said polymeric material;
C) melt-processing said polymeric material.

Unless otherwise stated, optional substituents described herein include halogen atoms and alkyl, acyl, nitro, cyano, alkoxy, hydroxy, amino, alkylamino, sulphinyl, alkylsulphinyl, sulphonyl, alkylsulphonyl, sulphonate, amido, alkylamido, alkoxycarbonyl, halocarbonyl and haloalkyl groups.

Unless otherwise stated, alkyl, alkenyl or alkynyl groups may have up to twenty carbon atoms, preferably up to fifteen carbon atoms, more preferably up to eleven carbon atoms.

Said vehicle suitably has one or more of the following properties:

Property No. 1—a flash point, suitably measured in accordance with ASTM D92 Cleveland Open Cup (COC) method of greater than 272° C., preferably greater than 280° C., more preferably greater than 285° C., especially greater than 290° C. The flash point may be less than 350° C., 340° C. or 330° C.

Property No. 2—a % weight retention determined by Thermogravimetric Analysis (TGA) as described in Example 1 hereinafter of greater than 80 wt %, preferably greater than 85 wt %, more preferably greater than 90 wt %.

Property No. 3—a boiling point at 760 mmHg in accordance with ASTM D1078 in the range 650 to 1150° C., preferably in the range 700° C. to 1000° C.

Property No. 4—a pour point measured in accordance with ASTM D97 in the range −55° C. to 0° C.

Property No. 5—a viscosity measured using a Brookfield viscometer, spindle 2, 20 rpm at 20° C. in the range 50-3500 cP, more preferably in the range 200-1800 cP.

Property No. 6—a number average molecular weight as measured by gel permeation chromatography (GPC) calibrated to a polystyrene standard in the range 600-1800 g/mol, preferably in the range 600-1600 g/mol, more preferably in the range 750-1250 g/mol.

Property No. 7—a molecular mass as calculated from its idealised molecular structure in the range 600-1800 g/mol, preferably in the range 600-1600 g/mol, more preferably in the range 750-1250 g/mol.

Said vehicle may include at least four of said properties, preferably at least five, more preferably at least six, especially all of said properties.

In a preferred embodiment, said vehicle has a flash point of at least 285° C., a % weight retention of greater than 85 wt %, and a number average molecular weight (Property No. 6) in the range 750-1250 g/mol.

When said liquid formulation includes more than one vehicle, said Properties 1 to 6 suitably refer to the predominant vehicle, but preferably apply to each vehicle included in the formulation.

Said formulation is suitably pumpable and stable to sedimentation of any solid particulates that may be present.

Said vehicle is suitably a liquid at STP. Said liquid formulation is preferably a liquid at STP. Said vehicle preferably has a boiling point (at atmospheric pressure of 760 mmHg) of greater than 300° C., preferably greater than 350° C., more preferably greater than 500° C. The boiling point may be less than 1150° C. or less than 1000° C. The melting point of the vehicle may be less than 0° C. or less than −10° C.

Preferably, the vehicle has good compatibility with said polymeric material such that when the polymer containing 1 wt % vehicle is cooled to room temperature excessive migration of the vehicle to the surface of the polymer is not observed.

Said vehicle preferably gives none or minimum fuming at a die plate when spun into fibre at an addition level of 1 wt %, preferably at 1.5 wt %.

Preferred liquid formulation preferably comprises a vehicle which does not significantly affect the tenacity of the synthetic fibre after it has been melt incorporated into the polymeric material. For example, the vehicle may be selected such that the tenacity ratio, defined as:

$$\frac{\text{Tenacity of fibre spun using 1.5 wt \% vehicle and selected polymeric material}}{\text{Tenacity of fibre spun selected polymeric material with no vehicle}}$$

is at least 0.87, preferably at least 0.89, more preferably at least 0.91. The tenacity ratio may be determined as described in Example 3 hereinafter. It may be determined with reference to a polymeric material which is a PET, for example Equipolymers C93.

Preferably, said vehicle includes a moiety —OCOR$^{50}$ wherein R$^{50}$ includes a carbon atom chain having at least 5, preferably at least 8 carbon atoms. Said carbon atom chain may include fewer than 24 carbon atoms or fewer than 20 carbon atoms. $R^{50}$ suitably includes at least 5, preferably at least 8 —$CH_2$— moieties; it may include less than 24 —$CH_2$— moieties. $R^{50}$ may include zero or one carbon-carbon double bonds; it preferably includes no carbon-carbon double bonds. $R^{50}$ preferably includes an unsubstituted $C_5$-$C_{24}$, more preferably $C_8$-$C_{24}$ alkyl group.

$R^{50}$ may consist of said carbon atom chain as described or may include another moiety in addition to said carbon atom chain. For example $R^{50}$ may be of formula —$R^{51}R^{52}$ wherein $R^{52}$ represents said carbon atom chain described and $R^{51}$ represents a linking moiety which links the carbon atom of the carbonyl moiety of —$OCOR^{50}$ to moiety $R^{52}$. $R^{51}$ may represent an alkyleneoxy moiety for example of formula A referred to below.

The total number of carbon atoms in $R^{50}$ may be at least 5, preferably at least 8, more preferably at least 10. The total number may be less than 30, for example less than 25.

The total number of hydrogen atoms in $R^{50}$ may be at least 11, preferably at least 17, more preferably at least 21. The total number may be less than 62 or less than 52.

The number of oxygen atoms in $R^{50}$ may be in the range 0 to 10.

$R^{50}$ preferably includes no atoms other than carbon, hydrogen and oxygen atoms. In some embodiments, $R^{50}$ only includes carbon and hydrogen atoms.

Said vehicle may include at least 3 ester moieties (i.e. —OCO— moieties). It may include 3 to 6 ester moieties. Each of said ester moieties may include a moiety —$OCOR^{50}$ as described.

The sum of the number of carbon atoms in all $R^{50}$ groups of moieties —$OCOR^{50}$ in said vehicle may be at least 15, preferably at least 24, more preferably at least 30. The sum of the number of —$CH_2$— moieties in all $R^{50}$ groups of moieties —$OCOR^{50}$ may be at least 15, preferably at least 24, more preferably at least 30.

Ester moieties of formula —$OCOR^{50}$ may be spaced apart by a chain comprising at least 3 carbon atoms. Said chain may be saturated and/or aliphatic; or part of an aromatic, for example phenyl moiety.

Said vehicle preferably includes no atoms other than carbon, hydrogen and oxygen atoms. It preferably includes carboxy (—COO—) oxygen atoms; and it may include ether (—O—) oxygen atoms. It preferably includes no other types of oxygen atoms (e.g. no —OH moieties).

Said vehicle may be selected from groups (A) to (G) as follows:

Group A

Pentaerythritol tri or tetra esters where the ester is derived or derivable from reaction of pentaerythritol with a carboxylic acid with a carbon chain length of $C_{12}$ to $C_{22}$, preferably $C_{14}$ to $C_{20}$. A preferred carboxylic acid is a $C_{18}$ oleic acid with $C_{18}$ isostearic acid being especially preferred.

Said vehicle may be of general formula

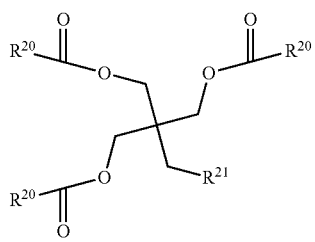

wherein each $R^{20}$ independently represents a $C_{11}$ to $C_{21}$ optionally-substituted, preferably unsubstituted, linear or branched, saturated or unsaturated alkyl group; and $R^{21}$ comprises a moiety $R^{20}COO$— or an hydroxy group. Preferably, $R^{21}$ comprises a moiety $R^{20}CO$—. Preferably, each $R^{20}$ represents the same group. $R^{20}$ may comprise carbon and hydrogen atoms only. It may include a —CH=CH— moiety, for example no more than one such moiety. $R^{20}$ suitably has a carbon chain length of $C_{13}$ to $C_{19}$, preferably a $C_{17}$ carbon chain length. $R^{20}$ preferably consists of an aliphatic, unsubstituted hydrocarbon moiety which optionally includes a —CH=CH— moiety. $R^{20}COO$— may comprise an oleic acid residue or preferably an isostearic acid residue.

Group B

Alkoxylated pentaerythritol tri or tetra esters where the ester is derived or derivable from the reaction of an alkoxylated pentaerythritol with a carboxylic acid with a carbon chain length of $C_{12}$ to $C_{22}$, preferably $C_{14}$ to $C_{20}$. The alkoxylated pentaerythritol may have the following structure:

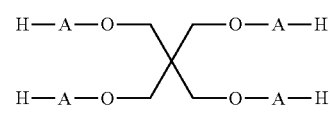

where A is —[—O—$CH_2$—$CH_2$—]$_x$-[—O—$CH_2$—CH($CH_3$)]$_y$—[O—$CH_2$—$CH_2$—$CH_2$—$CH_2$—]$_z$- where x, y and z can independently be between 0 and 10 such that x+y+z is >0 and is less than or equal to 10 and where the sum of all the alkoxylate units in the structure is between 4 and 40. It will be appreciated that moiety A bonds to the —O— atom via a —$CH_2$— moiety.

Said vehicle may be of general formula

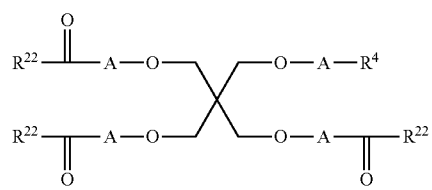

wherein A is as described above and each $R^{22}$ represents a $C_{11}$ to $C_{21}$ optionally-substituted, preferably unsubstituted, linear or branched saturated or unsaturated alkyl group; and $R^4$ comprises a moiety $R^{22}CO$— or a hydrogen atom. Preferably, each $R^{22}$ represents the same group. $R^{22}$ may comprise carbon and hydrogen atoms only. It may include a —CH=CH— moiety, for example no more than one such moiety. $R^{22}$ suitably has a carbon chain length of $C_{13}$ to $C_{19}$ carbon atoms. $R^{22}$ preferably consists of an aliphatic, unsubstituted hydrocarbon moiety which optionally includes a —CH=CH— moiety.

Group C

Dipentaerythritol penta or hexa esters where the ester is derived from the reaction of dipentaerythritol with a carboxylic acid with a carbon chain length of $C_5$ to $C_{18}$, preferably $C_8$ to $C_{18}$, more preferably $C_8$ to $C_{10}$.

Said vehicle may be of general formula

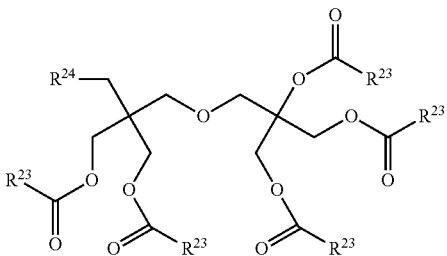

wherein each $R^{23}$ independently represents a $C_4$ to $C_{17}$ optionally-substituted, preferably unsubstituted, linear or branched, saturated or unsaturated alkyl group; and $R^{24}$ comprises a moiety $R^{23}COO$— or an hydroxy group. Preferably, each $R^{23}$ represents the same group. $R^{23}$ may comprise carbon and hydrogen atoms only. It may include a —CH=CH— moiety, for example no more than one such moiety. $R^{23}$ suitably has a carbon chain length of $C_7$ to $C_{17}$, preferably a $C_7$ to $C_9$ carbon chain length. $R^{23}$ preferably consists of an aliphatic, unsubstituted hydrocarbon moiety which optionally includes a —CH=CH— moiety.

Group D

Alkoxylated dipentaerythritol penta or hexa esters where the ester is derived or derivable from the reaction of an alkoxylated dipentaerythritol with a carboxylic acid with a carbon chain length of $C_5$ to $C_{16}$, preferably $C_8$ to $C_{14}$. The alkoxylated pentaerythritol may have the following structure:

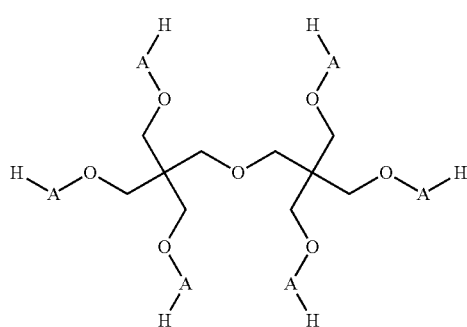

where A is —[—O—CH$_2$—CH$_2$—]$_x$-[—O—CH$_2$—CH(CH$_3$)]$_y$—[O—CH$_2$—CH$_2$—CH$_2$—CH$_2$—]$_z$- where x, y and z can independently be between 0 and 6 such that x+y+z is >0 and is less than or equal to 6 and where the sum of all the alkoxylate units in the structure is between 6 and 36. It will be appreciated that moiety A bonds to the —O— atom via a —CH$_2$— moiety.

Said vehicle may be of general formula

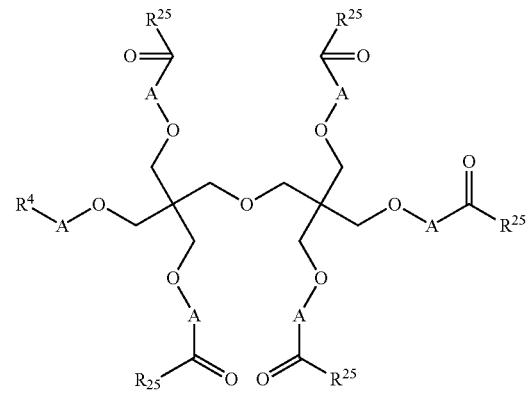

wherein A is as described above and each $R^{25}$ represents a $C_{14}$ to $C_{15}$ optionally-substituted, preferably unsubstituted, linear or branched saturated or unsaturated alkyl group; and $R^4$ comprises a moiety $R^{25}CO$— or a hydrogen atom. Preferably, each $R^{25}$ represents the same group. $R^{25}$ may comprise carbon and hydrogen atoms only. It may include a —CH=CH— moiety, for example no more than one such moiety. $R^{25}$ suitably has a carbon chain length of $C_7$ to $C_{13}$ carbon atoms.

Group E

Trimethylolpropane triesters where the ester is derived or derivable from the reaction of trimethylolpropane with a carboxylic acid with a carbon chain length of $C_8$ to $C_{22}$, preferably $C_{10}$ to $C_{20}$, more preferably $C_{12}$ to $C_{18}$.

Said vehicle may be of general formula

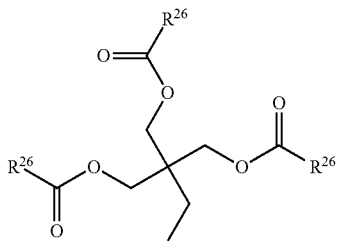

Preferably, each $R^{26}$ represents the same group. $R^{26}$ may comprise carbon and hydrogen atoms only. It may include a —CH=CH— moiety, for example no more than one such moiety. $R^{26}$ suitably has a carbon chain length of $C_7$ to $C_{21}$, preferably a carbon chain length of $C_9$ to $C_{19}$ and more preferably, a carbon chain length of $C_{11}$ to $C_{17}$.

Group F

Alkoxylated trimethylolpropane triesters where the ester is derived or derivable from the reaction of an alkoxylated trimethylolpropane with a carboxylic acid with a carbon chain length of $C_8$ to $C_{22}$, preferably $C_{10}$ to $C_{20}$, more preferably $C_{12}$ to $C_{18}$. The alkoxylated trimethylolpropane may have the following structure:

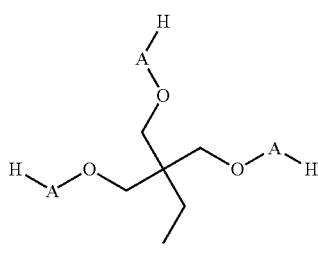

where A is -[—O—CH$_2$—CH$_2$—]$_x$-[—O—CH$_2$—CH(CH$_3$)]$_y$-[O—CH$_2$—CH$_2$—CH$_2$—CH$_2$—]$_z$- where x, y and z can independently be between 0 and 15 such that x+y+z is >0 and is less than or equal to 15 and where the sum of all the alkoxylate units in the structure is between 3 and 45. It will be appreciated that moiety A bonds to the —O— atom via a —CH$_2$— moiety.

Said vehicle may be of general formula

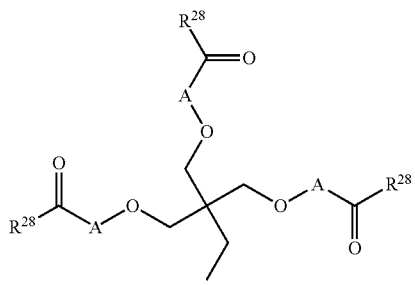

wherein A is as described above and each R$^{28}$ represents a C$_7$ to C$_{21}$ optionally-substituted, preferably unsubstituted, linear or branched saturated or unsaturated alkyl group. Preferably, each R$^{28}$ represents the same group. R$^{28}$ may comprise carbon and hydrogen atoms only. It may include a —CH=CH— moiety, for example no more than one such moiety. R$^{28}$ suitably has a carbon chain length of C$_9$ to C$_{19}$ carbon atoms, more preferably C$_{11}$ to C$_{17}$.

Group G

Esters of the tri-carboxylic acid of general formula:

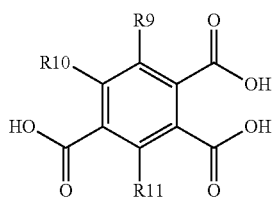

(V)

where R$^9$, R$^{10}$ and R$^{11}$ independently represent a hydrogen atom, an ester group or an optionally-substituted, preferably unsubstituted, alkyl group. At least one, preferably each of R$_9$, R$_{10}$ and R$_{11}$ represent hydrogen atoms.

The preferred ester-containing vehicles are derived or derivable by reacting the described tri-carboxylic acids with C$_8$ to C$_{24}$ aliphatic alcohols, preferably C$_{10}$ to C$_{18}$, most preferably C$_{13}$.

The preferred tri-carboxylic acids may be reacted with polyalkoxylated fatty alcohols. The alkoxylating moieties are preferably present at between 1 and 80 moles per each fatty alcohol, more preferably between 1 and 70 and most preferably between 1 and 60 moles per fatty alcohol.

Preferred fatty alkoxylated esters derived or derivable from said tri-carboxylic acid groups include polyalkoxylated fatty alcohol chains:

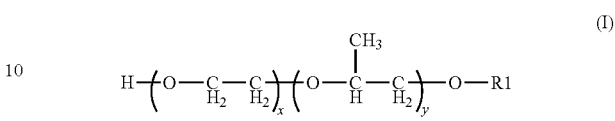

(I)

The chains suitably form ester bonds with carboxylic acid groups via the —O— moiety at the left hand side of structure I.

R1 may be unsaturated or saturated, unsubstituted or substituted, aromatic or aliphatic fatty moiety with between 1 and 20 (for example between 1 and 10) carbon atoms. x and y may independently be between 0 and 10. The sum of all x and y must be greater than 0. The sum of all x and y preferably does not exceed 70.

The fatty alcohols such as species (I) may be prepared by the polyalkoxylation of saturated or unsaturated, substituted or unsubstituted aliphatic or aromatic fatty alcohols. As is well known to those skilled in the art, the fatty moieties are often present as a mixture and so the vehicle may comprise a mixture of compounds.

The tricarboxylic acid derived compounds are suitably esterified on two or three of the carboxylic acid groups (of the acid of formula V) with the above described aliphatic or polyalkoxylated fatty alcohol.

The fatty alkoxylate esters may be prepared by reaction of the starting alcohol with either ethylene or propylene oxide in the presence of an acidic or basic catalyst.

Preferred esters of said tri-carboxylic acids may be of formula

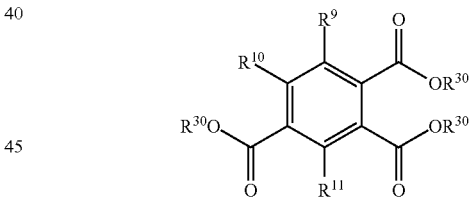

wherein R$_9$, R$_{10}$ and R$_{11}$ are as described above and R$^{30}$ represents a C$_8$ to C$_{24}$ optionally-substituted, preferably unsubstituted, linear or branched, saturated or unsaturated alkyl group; or represents a moiety of formula I which excludes the hydrogen atom of the terminal —OH group.

Preferably, each R$^{30}$ represents the same group. R$^{30}$ may comprise carbon and hydrogen atoms only. It may include a —CH=CH— moiety, for example no more than one such moiety. R$^{30}$ suitably has a carbon chain length of C$_{10}$ to C$_{18}$, preferably C$_{13}$ carbon atoms.

It is found that vehicles of the type described, for example in Groups A to G, can advantageously be used to introduce additives into polymeric materials prior to or preferably during melt-processing, without any significant detrimental effects on the properties of the polymeric materials.

Said vehicle is preferably selected from Groups A, C, E and G.

Preferably, said polymeric material comprises a synthetic thermoplastic polymer. Said polymeric material is preferably able to be formed into fibres. Said polymeric material may be a condensation polymer, for example a condensation polymer which may depolymerise in the presence of water and/or a carrier with appropriate functional groups (which could include but is not limited to hydroxyl and carboxylic acid species). Said polymeric material may be selected from polyesters, polyamides, polypropylene, polycaprolactone, polycarbonates, acrylics and aramids.

Examples of polyamides include aliphatic PA6 and PA6,6, semi-aromatic polyphthalamides (e.g. PA 6T) and aromatic polyamides in which at least 85% of the amide linkages, (—CO—NH—) are attached directly to two aromatic rings—for example the para-aramids.

Said polymeric material preferably comprises a polyester which may be selected from poly(ethylene terephthalate) (PET), poly(butylene terephthalate) (PBT), poly(trimethylene terephthalate) (PTT), poly(ethylene naphthalate) (PEN), poly(1,4-cyclo-hexylenedimenthylene)terephthalate (PCT), poly(ethylene-co-1,4-cyclohexylenedimethylene terephthalate) (PETG), copoly(1,4-cyclohexylene dimethylene/ethylene terephthalate) (PCTG), poly(1,4-cyclohexylene dimethylene terephthalate-co-isophthalate) (PCTA), poly(ethylene terephthalate-co-isophthalate (PETA), poly(lactic acid (PLA), poly(glycolic acid) (PGA) and their blends of copolymers. Said polymeric material preferably comprises, more preferably consists essentially of PET.

A typical spinnable condensation polymer such as polyester, for example PET, may have up to 250 or up to 200 repeat units (e.g. molecular weight of up to 25,000 or up to 20,000). The number of repeat units may be in the range 50-200, suitably 75-200, preferably 75-125 repeat units. A typical spinnable polymer may have about 100 repeat units. The condensation polymer may be linear and be able to reach the high levels of orientation and crystallinity which are induced during spinning and drawing processes.

Typical spinnable polyesters have an IV in the range 0.62 to 1 dl/g. Preferred polyesters have an IV within the range of 0.5 to 1.2 dl/g when measured using standard techniques (for example ASTM D4603-03).

Said additive may be selected from colourants, stabilizers, delusterants, anti-static agents, optical brighteners, processing aids, light reflective additives, anti-soil additives, friction modifiers, anti-oxidants and anti-flammability additives. Said additive preferably comprises a colourant. A said colourant may be a dye or pigment. A dye may be especially preferred.

Said liquid formulation may include less than 80 wt %, suitably less than 70 wt %, preferably less than 65 wt %, more preferably less than 60 wt % of a said additive (e.g. a colourant). Typically, said formulation includes 5-80 wt % of a said additive (e.g. a colourant). The total amount of additives (selected from colourants, stabilizers, delusterants, anti-static agents, optical brighteners, processing acids, light reflective additives, anti-soil additives, friction modifiers, anti-oxidants, insecticides and anti-flammability additives) in said formulation may be more than 1 wt %, suitably more than 2 wt %, preferably more than 5 wt %; typically the total amount of additives is in the range 5-80 wt %. In one embodiment, the total amount of additives may be in the range 20-60 wt %. For the avoidance of doubt, the wt % refers to the wt % of additive excluding any vehicle (or the like) with which the additive may be formulated prior to being incorporated into the liquid formulation.

More than one additive may be required (and included in said formulation). For example, a mixture of dyes and/or pigments may be required in order to provide a colormatch to a customer requirement. Other additives which are commonly added to fibre may include light reflectance additives, anti-static or anti-soil species, friction modifiers, anti-oxidants, anti-flammability additives etc. These may be added alone or in a package together with a colored species.

The method may include introducing less than 10 wt %, more suitably less than 5 wt %, preferably less than 4 wt % of a said additive, selected from those described above (preferably a colourant), into said polymeric material via said liquid formulation. At least 1 wt % of a said additive (preferably a colourant) may be introduced via said liquid formulation. The total amount of additives, selected from those described above, introduced into said polymeric material via said liquid formulation may be less than 10 wt %, more preferably less than 5 wt %. Typical amounts of additives introduced using the method described are typically in the range of 0.05-3 wt %.

Said liquid formulation may include at least 20 wt % of vehicle, for example a single type of vehicle. Said formulation may include 80 wt % or less of vehicle, for example a single type of vehicle.

Preferably, the vehicle has good compatibility with said polymeric material. Compatibility of the vehicle with polyester may be assessed by examining the level of haze that is created when mouldings are formed.

Preferred vehicles tend not to migrate excessively from polymer moldings once cooled to room temperature.

Preferred carriers give a low or minimum clouding, for example less than 50% haze at levels of up to 5 wt % in the polymeric material.

The method may comprise introducing less than 10 wt %, preferably less than 6 wt % and more preferably less than 4 wt % of vehicle into the polymeric material, via said formulation. The amount introduced may be less than 3 wt %.

The formulation may optionally include a dispersant which is used to improve the shelf-life and prevent sedimentation of any solid particulates. Said dispersant may comprise a backbone, the function of which is to provide compatibility with the carrier phase and a headgroup which anchors the dispersant onto the surface of the additive. Said dispersant may be selected from single molecule or polymeric species with a range of functionalities within the molecular backbone and anchor groups.

Said liquid formulation may include less than 30 wt %, preferably less than 20 wt %, more preferably less than 10 wt %, especially less than 5 wt % of a said dispersant. A dispersant may not be required if the additive is a dye.

In the method, the liquid formulation is preferably dosed into said polymeric material when said polymeric material is in a molten state. Said polymeric material may be melted in an extruder and said liquid formulation may be contacted with the polymeric material in said extruder or downstream thereof. Said liquid formulation is preferably injected at relatively high pressure (5-120 bar) into the polymeric material. A mixing means is suitably provided for facilitating mixing of the liquid formulation and polymeric material. The mixing means may be provided by using either static or dynamic mixers. Dynamic mixers are preferred in applications where liquid formulations are added to the melt phase of the polymer i.e. where small amounts of low viscosity fluid require mixing with large volumes of high viscosity fluid. Cavity transfer mixers are especially preferred due to the high distributive mixing forces that are applied down the length of the mixer enabling the required high shear process to be applied in a controllable manner. Downstream of the point of contact of liquid formulation and polymeric material, there may be a spinning means for spinning the polymeric material to define fibres. The same general set up could be used to make other articles from thermoplastic polymers; for example sheet or film—the means of exit would be through the relevant die heads.

Said polymeric material which is contacted in the method may be supplied directly from a reactor in which the polymeric material is made in a polymerisation reaction. Thus, said polymeric material used suitably does not comprise pellets or granules or other isolated polymeric material but suitably comprises molten polymeric material from a polymerisation reactor which is coupled to apparatus for contacting said polymeric material with liquid formulation as described.

According to a second aspect of the invention, there is provided a liquid formulation for addition to a polymeric material, said liquid formulation comprising an additive (for example a colourant) and a vehicle as described according to the first aspect.

The formulation may have any feature of the formulation of the first aspect.

According to a third aspect of the invention, there is provided a product comprising a polymeric material incorporating an additive (for example a colourant), wherein said product includes one or more of the following features:

(a) free vehicle of the type described according to the first aspect;

(b) a residue derived from said vehicle.

Free vehicle (or a residue) may be detected by a suitable technique for example extraction from the product followed by mass spectrometry or a chromatographic technique.

Said product of the third aspect is preferably a fibre, especially a polyester fibre.

According to a fourth aspect of the invention, there is provided an article incorporating a product of the third aspect. The product of the third aspect may be woven to define at least part of the article. The article may be a garment.

According to a fifth aspect, there is provide a method of producing a fibre, the method comprising introducing an additive into a polymeric material as described according to the first aspect and spinning the polymeric material which includes the additive to produce a fibre, suitably a substantially continuous length of fibre, for example of greater than 5 m or 10 m.

The method may include delivery of said polymeric material into an extruder directly from a reactor in which the polymeric material is produced.

Preferably, said polymeric material is a polyester, for example polyethylene terephthalate.

According to a sixth aspect, there is provided an assembly comprising:

(a) an extruder for extruding polymeric material;

(b) a receptacle containing a liquid formulation as described according to the first aspect;

(c) injection means operatively connected to the receptacle for injecting liquid formulation extracted from the receptacle into the polymeric material in or downstream of the extruder;

(d) mixing means for mixing liquid formulation and polymeric material.

The assembly may further include a polymerisation reactor for producing said polymeric material in a polymerisation reaction, suitably from monomers, said reactor being operatively connected to the extruder for delivering polymeric material from reactor to extruder.

The assembly may further comprise spinning means downstream of the extruder and injection means for receiving polymeric material which has been contacted with said liquid formulation and spinning the polymeric material to produce fibre.

Any invention described herein may be combined with any feature of any other invention or embodiment described herein mutatis mutandis.

Specific embodiments of the invention will now be described, by way of example with reference to FIG. 1 which is a schematic representation of a pilot fibre line.

The following materials are referred to hereinafter:

Pentaerythritol ethoxylate exSigma-Aldrich CAS No. 30599-15-6

Trimethylolpropane ethoxylate exSigma-Aldrich Cas No. 50586-59-9

Lauric acid exSigma-Aldrich Cas No. 143-07-7

Decanoic acid exSigma-Aldrich Cas No. 334-48-5

N,N-Dicyclohexylcarbodiimide exSigma-Aldrich Cas No. 538-75-0

4-Dimethylaminopyridine exSigma-Aldrich Cas No. 1122-58-3

Dichloromethane exSigma-Aldrich Cas No. 75-09-2

Magnesium sulphate exSigma-Aldrich Cas No. 7487-88-9

PTIS—pentaerythritol tetraisostearate sold as CRODAMOL™ PTIS by Croda.

PTO—pentaerythritol tetraioleate sold as PS2057™ by Esterchem Ltd.

PTC—pentaerythritol tetracaprylate/caprate sold as Crodamol PTC [LQ];

PTL-EO—pentaerythritol tetralaurate ethoxylate synthesized in laboratory to 90% purity by Colormatrix.

TTIS—trimethylolpropane triisostearate sold as Crodamol TTIS [LQ] by Croda.

TTC-EO—trimethylolpropane tricaprate ethoxylate synthesized in laboratory to 89% purity by Colormatrix.

TDTM—tri-n-tridecyl trimellitate sold as Pelemol™ TDTM by Phoenix Chemical Inc.

TOTM—trioctyltrimellitate sold as DiPlast TM8 by Polynt SA.

Liquid carriers referred to herein may be commercially available and/or may be made in processes the same as/or similar to the processes of Examples A and B below.

Table 1 summarises features of the aforementioned liquid carriers.

TABLE 1

| Material | Ester Alkyl chain length | Number of ester main chains | Calculated molecular mass |
| --- | --- | --- | --- |
| PTIS | 18 | 4 | 1202 |
| PTO | 18 | 4 | 1194 |
| PTC | 8/10 | 4 | 685 |
| PTL-EO | 12 | 4 | 1525 |
| TTIS | 18 | 3 | 934 |
| TTC-EO | 10 | 3 | 912 |
| TDTM | 13 | 3 | 757 |
| TOTM | 8 | 3 | 547 |

In general terms, apparatus for use in the method may be as described in FIG. 1. Injection apparatus 4, for example a cavity transfer mixer, may be used to inject liquid containing vehicle(s) and additive(s) into a PET melt at position 2. Die head pressure may be assessed at position 3. The mixture is spun via spinning head 6.

In the following, Example 1 describes a thermogravimetric analysis (TGA) of vehicles which is relevant to whether or not the vehicle may disadvantageously fume at a die exit in use. Examples 2 and 3 describe how the intrinsic viscosity and fibre tenacity of spun samples may be assessed. Examples 4 to 12 describe formulations and/or tests on a range of formulations to illustrate advantages of preferred vehicles. Examples 13 and 14 describe formulations used in fibre formation.

EXAMPLE 1

Determination of TGA Weight Retention

Using a TA Instruments TGA Q500 the TGA weight retention of the example liquid carriers was determined by placing 10 mg of a selected carrier in a TGA sample pan and recording the weight loss on heating from 40° C. to 295° C. at 20° C./min and then holding the sample at 295° C. for 30 minutes. After this heating cycle the % weight retention was recorded.

EXAMPLE 2

Determination of Intrinsic Viscosity (IV)

The intrinsic viscosity of PET fibre samples was determined using ASTM D4603 at 30° C. (concentration of 0.5 wt/v; solvent 60/40 phenol/tetrachloroethane).

EXAMPLE 3

Determination of Fibre Tenacity

Using an Instron 3365 the tenacity of the fibre sample was determined at 20° C. and an extension rate of 250 mm/min (ASTM D885).

COMPARATIVE EXAMPLE 4

Processing in the Absence of Vehicle and Testing

A sample of medium orientated (MO) polyethylene terephthalate (PET) fibre was produced by melt extruding a sample of PET (Equipolymers C93), that had been dried for 4 hrs at 170° C. through a 30 mm extruder (L/D ratio of 24/1) fitted with a cavity transfer mixer (CTM) and a 72 hole (hole diameter 0.4 mm) spin pack at 285° C. The extruded fibre was drawn from the spinneret at 2500 m/min. Table 2 records the tensile properties of the fibre measured in accordance with Example 3 and the IV of the fibre measured in accordance with Example 2.

COMPARATIVE EXAMPLE 5

Processing in the Presence of Comparative Vehicle and Testing

The fibre extrusion process in example 4 was used to produce a sample of MO PET fibre containing 1.5% PTC which was fully dispersed into the molten polymer by injection into the CTM (mixer speed 45 rpm). The extruded fibre was drawn from the spinneret at 2500 m/min. During extrusion fumes and an unpleasant odour were detected at the die plate. Table 2 records the tensile properties of the fibre measured in accordance with Example 3 and the IV of the fibre measured in accordance with Example 2.

EXAMPLES 6, 7 AND 8

Processing in the Presence of Vehicles and Testing

The process of Example 5 was repeated to produce fibres using 1.5% PTO, 1.5% PTIS, and 1.5% TDTM, respectively. Table 2 records the tensile properties of the fibre measured in accordance with Example 3 and the IV of the fibre measured in accordance with Example 2.

COMPARATIVE EXAMPLE 9

Processing in the Presence of Comparative Vehicle and Testing

The process of Example 5 was repeated to produce fibre sample containing 1.5% TOTM. During extrusion a considerable level of fumes were observed at the die plate. Table 2 records the tensile properties of the fibre measured in accordance with Example 3 and the IV of the fibre measured in accordance with Example 2.

EXAMPLES 10 TO 12

Processing in the Presence of Vehicles and Testing

The process of Example 5 was repeated to produce fibres using 1.5% PTL-EO, 1.5% TTIS and 1.5% TTC-EO respectively. Table 2 records the tensile properties of the fibre measured in accordance with Example 3 and the IV of the fibre measured in accordance with Example 2.

TABLE 2

| Example | Carrier system | Flash point COC (° C.) | TGA weight retention (wt %) | Die pressure (bar) | Intrinsic viscosity (dL/g) | Fibre tenacity (cN/dtex) | Fuming observation at die exit |
|---|---|---|---|---|---|---|---|
| Comparative Example 4 | None | — | — | 75 | 0.657 | 2.41 | None |
| Comparative Example 5 | 1.5% PTC | ≥270 | 73.58 | 46 | 0.601 | 1.93 | Fumes & odour |
| Example 6 | 1.5% PTO | ≥285 | 95.61 | 59 | 0.633 | 2.15 | No Fumes |
| Example 7 | 1.5% PTIS | ≥300 | 97.60 | 59 | 0.632 | 2.22 | No Fumes |
| Example 8 | 1.5% TDTM | ≥275 | 87.56 | 58 | 0.623 | 2.14 | Negligible Fumes |
| Comparative Example 9 | 1.5% TOTM | ≥250 | 58.15 | 55 | 0.616 | 2.06 | Considerable fuming |
| Example 10 | 1.5% PTL-EO | ≥285 | 88.30 | 57 | 0.618 | 2.10 | Negligible Fumes |
| Example 11 | 1.5% TTIS | ≥300 | 97.23 | 60 | 0.628 | 2.26 | No Fumes |
| Example 12 | 1.5% TTC-EO | ≥285 | 87.50 | 58 | 0.619 | 2.16 | Negligible Fumes |

Table 2 also details the flash point for each vehicle, determined in accordance with ASTM D92 (Cleveland Open Cup (COC) method), this being relevant to the thermal stability of the vehicle, in use. Additionally, the table details the die pressure head drop of the polymer melt measured at point 3 in FIG. 1. As the die head pressure is reduced it starts to affect the properties of the spun fibre and increase the rate of filament breaks.

From the results in Table 2, the following should be noted:
(a) Preferred carriers exhibit no or negligible fuming at the die exit whereas comparative examples 4, 5 and 9 disadvantageously exhibit considerable fuming and/or odour;
(b) Preferred carriers have a flash point of ≥275° C.;
(c) Preferred carriers exhibit higher TGA weight retention than the comparative examples;
(d) Use of preferred carries results in higher die pressures than the comparative examples;
(e) Use of preferred carries results in higher polymer IV which is closer to polymer IV when no carrier is used;
(f) Use of preferred carriers leads to high fibre tenacity.

EXAMPLE 13

Preparation of Fibre Filaments Incorporating White Pigment

A dispersion of 700 g of titanium dioxide (Hombitan LC-S), 128.9 g of TDTM, 128.8 g of PTIS 40.3 g Solsperse 3000 pigment dispersant from Lubrizol, 1 g Irganox 1010 (anti-oxidant) and 1 g Doverphos S9228T (anti-oxidant) was mixed using a high shear disperser for 2 minutes until all the components were fully dispersed. The dispersion had a Brookfield viscosity at 20° C. of 10,100 cP (spindle 7, 20 rpm). 35 g of the dispersion was mixed with 1000 g dry PET pellets (Equipolymers C93) and extruded into fibre on 30 mm extruder (L/D ratio of 24/1) fitted with a 72 hole (hole diameter 0.4 mm) spin pack at 285° C. The extruder fibre was drawn from the spinneret at 2800 m/min.

During extrusion of the fibre no fuming was observed at the die plate. The tenacity of the fibre produced was 2.18 cN/dtex; measured in accordance with Example 3. A representative sample of the fibre was examined by optical microscopy which shows that a very good dispersion of the titanium dioxide pigment throughout the fibre filaments.

EXAMPLE 14

Preparation of Fibre Filaments Incorporating Black Pigment

A dispersion of 300 g of carbon black (Monarch 430), 4180 g PTIS, 60 g TOTM, 160 g Tegomer DA100N, 60 g Solplus (TM)K240 (pigment dispersant), 1 g Irganox 1010 (anti-oxidant) and 1 g Doverphos S9228T (anti-oxidant) were mixed and milled using a Eiger bead mill (1 mm diameter glass beads) for 45 mins until all the components were fully dispersed and the particle size of the dispersion (determined by optical microscopy) was less than 5 µm. The milled dispersion had a Brookfield viscosity at 20° C. of 15,100 cP (spindle 7, 20 rpm). The fibre extrusion process in example 4 was used to produce a sample of MO PET fibre containing 2% of this carbon black dispersion which was fully dispersed into the molten polymer by injection into the CTM (mixer speed 80 rpm). The extruder fibre was drawn from the spinneret at 2800 m/min.

During extrusion of the fibre no fuming was observed at the die plate. The tenacity of the fibre produced was 2.015 cN/dtex; measured in accordance with Example 3. A representative sample of the fibre was examined by optical microscopy which shows that a very good dispersion of the carbon black pigment throughout the fibre filaments.

Thus, it is clear from the above that preferred vehicle can be used to advantageously produce fibre filaments incorporating pigments (or other additives).

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of introducing an additive into a polymeric material comprising:
    A) selecting a liquid formulation comprising an additive and a vehicle;
    B) contacting the liquid formulation with said polymeric material;
    C) melt-processing said polymeric material;
   wherein said vehicle is selected from:
    pentaerythritol tri or tetra esters wherein the ester is derived or derivable from reaction of pentaerythritol with a carboxylic acid with a carbon chain length of $C_{12}$ to $C_{22}$; and trimethylolpropanetriisostearate.

2. A method according to claim 1, wherein said vehicle includes no atoms other than carbon, hydrogen and oxygen atoms.

3. A method according to claim 1, wherein said polymeric material comprises a synthetic thermoplastic polymer selected from polyesters, polyamides, polypropylene, polycaprolactone, polycarbonates, acrylics and aramids.

4. A method according to claim 3, wherein said polymeric material comprises a polyester.

5. A method according to claim 3, wherein said additive comprises a colourant.

6. A method according to claim 3, the method including introducing at least 0.05 wt % and less than 10 wt % of additive into said polymeric material via the liquid formulation.

7. A method according to claim 3, wherein said liquid formulation includes at least 20 wt % of vehicle and 80 wt % or less of vehicle.

8. A method according to claim 3, wherein in the method the liquid formulation is dosed into said polymeric material when said polymeric material is in a molten state.

9. A method according to claim 8, wherein downstream of the point of contact of liquid formulation and polymeric material, there is a spinning means for spinning the polymeric material to define fibres.

10. A method of producing a fibre, the method comprising introducing an additive into a polymeric material using the method of claim 1 and spinning the polymeric material which includes the additive to produce a fibre.

11. A method according to claim 1, wherein said vehicle is selected from:
(A) a vehicle of general formula

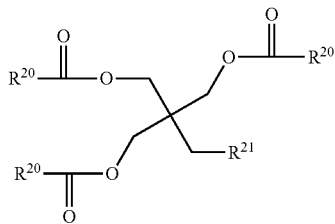

wherein each $R^{20}$ independently represents a $C_{11}$ to $C_{21}$ optionally-substituted, linear or branched, saturated or unsaturated alkyl group; and $R^{21}$ comprises a moiety $R^{20}COO$— or an hydroxy group.

12. A method according to claim 11, wherein $R^{21}$ comprises a moiety $R^{20}CO$—.

13. A method according to claim 11, wherein $R^{20}$ comprises carbon and hydrogen atoms only.

14. A method according to claim 11, wherein $R^{20}$ has a carbon chain length of $C_{13}$ to $C_{19}$.

15. A method according to claim 11, wherein $R^{20}$ has a $C_{17}$ carbon chain length.

16. A method according to claim 11, wherein $R^{20}$ consists of an aliphatic, unsubstituted, hydrocarbon moiety which optionally includes a —CH=CH— moiety.

17. A method according to claim 11, wherein $R^{20}COO$— comprises an isostearic acid residue.

18. A method according to claim 11, wherein each $R^{20}$ represents the same group.

19. A method according to claim 11, wherein said vehicle is pentaerithritol tetraisostearate.

* * * * *